Fig. 2.

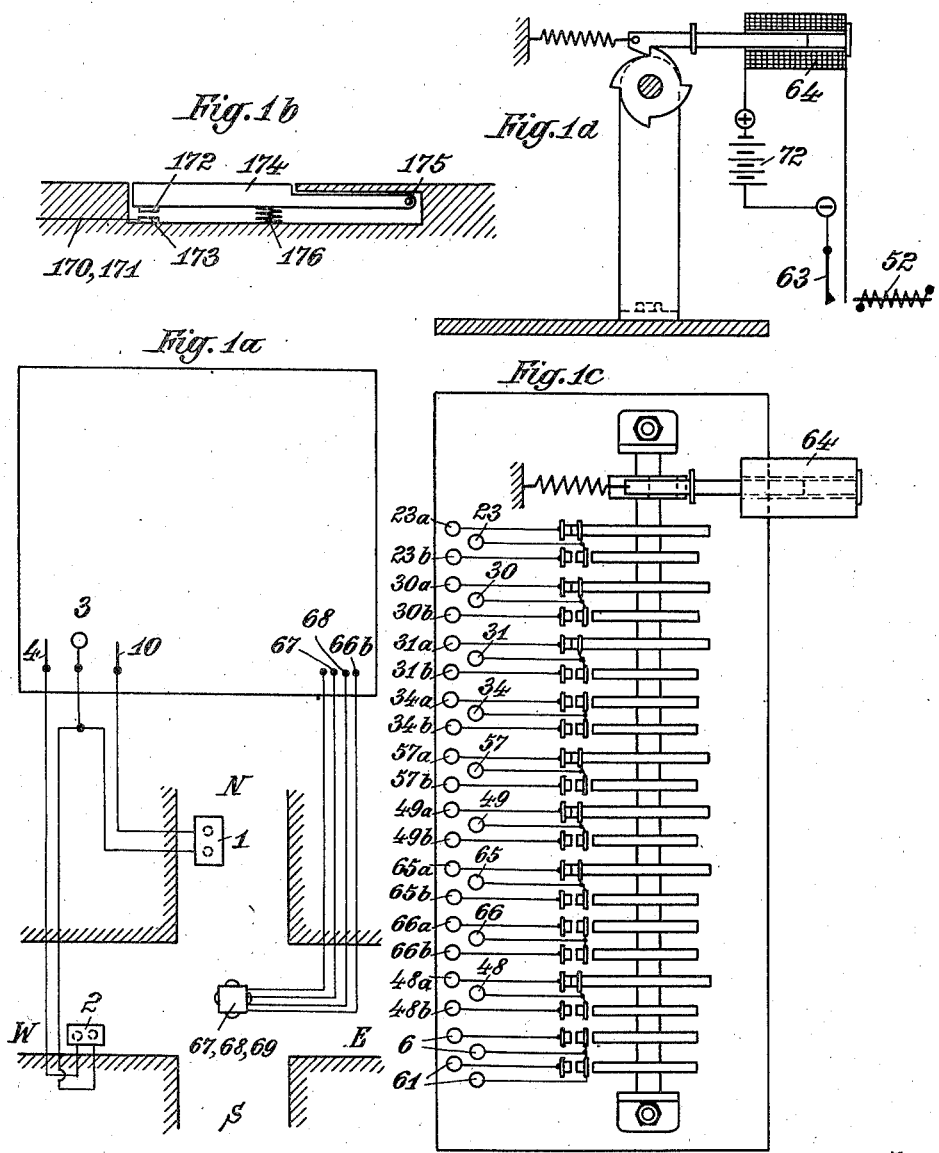

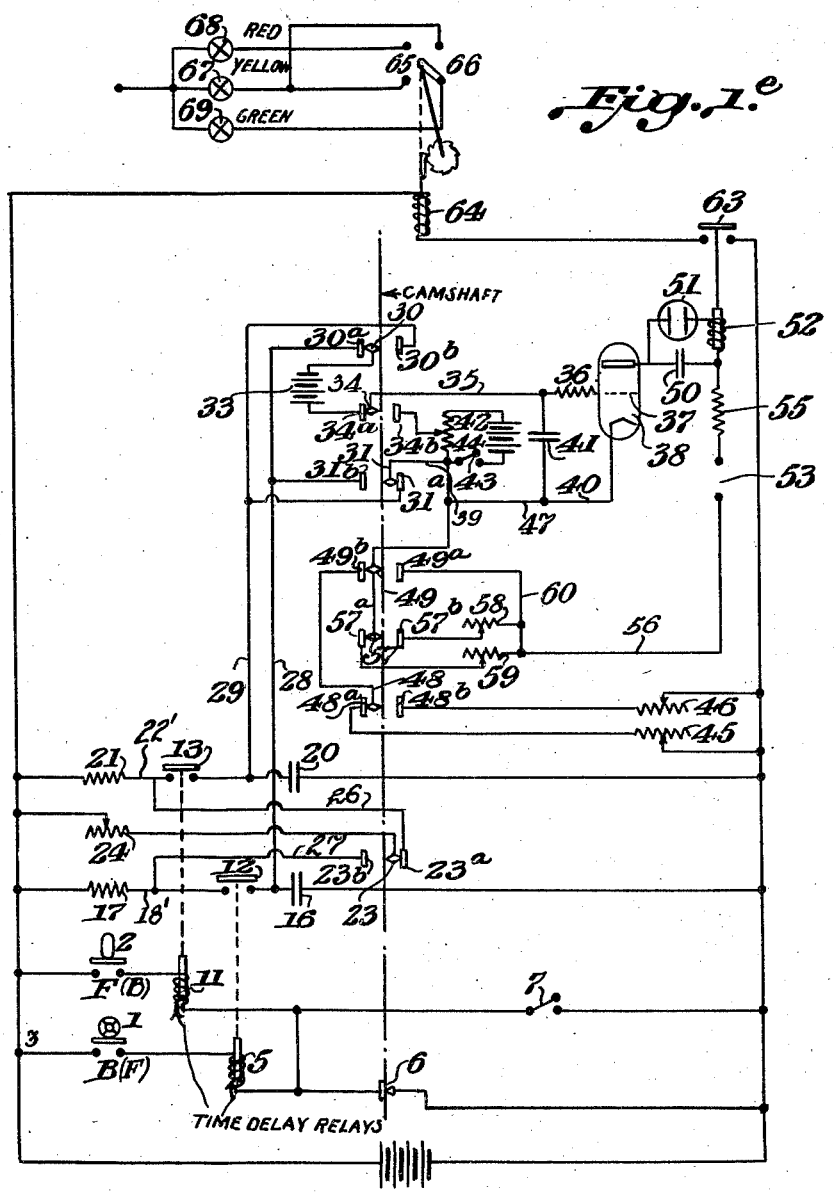

| | | yellow | green | yellow | red |
|---|---|---|---|---|---|
| 23 | a | | | | |
| | b | | | | |
| 30 | a | | | | |
| | b | | | | |
| 31 | a | | | | |
| | b | | | | |
| 34 | a | | | | |
| | b | | | | |
| 57 | a | | | | |
| | b | | | | |
| 49 | a | | | | |
| | b | | | | |
| 65 | a | | | | |
| | b | | | | |
| 66 | a | | | | |
| | b | | | | |
| 48 | a | | | | |
| | b | | | | |
| 6 | | | | | |
| 61 | | | | | |
| 7, 62, 43 | | | | | |

Patented Aug. 9, 1938

2,126,432

UNITED STATES PATENT OFFICE 2,126,432

AUTOMATIC TRAFFIC CONTROL SYSTEM

Fritz von Opel, Berlin-Charlottenburg, Germany

Application June 29, 1934, Serial No. 733,113
In Germany July 8, 1933

6 Claims. (Cl. 177—337)

My invention relates to automatic traffic control systems for street crossings, and it is an object of my invention to simplify a system such as described in by co-pending application, Ser. No. 667,868, filed April 25, 1933, for "Automatically operated traffic control system."

In a system of this kind, as described in my said co-pending application, I have provided a signalling device, normally a lamp displaying green light for "proceed", red light for "stop", and yellow light for "caution". The signalling device or lamp is operated by a motor and a switching drum. Vehicle-operated controls are provided in the streets of the crossing, and variable resistances are connected to the motor for increasing and decreasing its speed. The speed increasing means is operated by the control in the blocked street, and the speed decreasing means is operated by the control in the free street.

In such a system, the durations of the periods, for which a street is blocked, and for which it is free, are functions both of the number of vehicles waiting in the blocked street, and of the number of vehicles moving in the free street. Between a variable upper and a variable lower limit for which the system is adjusted, the "blocked" and "free" periods vary in proportion to the density of the traffic. As the vehicles waiting in the blocked street, through the medium of the vehicle-actuated control, operate the speed increasing means of the motor, they cause a shortening of the "blocked" period, and, as the vehicles moving in the free street similarly operate the speed decreasing means of the motor, they cause a lengthening of the "free" period.

In the system referred to, the operation is principally performed by mechanical means such as step-by-step rotary switches for effecting the speed increase and decrease. The object of my present invention is to dispense with all rotary or constantly moving mechanical means and to replace them by electrical means. In this manner, the inevitable slack, inertia forces, resistance, etc., of such step-by-step switch gear are eliminated.

It is understood, in the present description and claims, that the expression "street crossing" includes any intersection of traffic lines and is not limited to streets. For instance, if such lines intersect in a square, this is not exactly a "street crossing" but my system may be used in such and other cases as well as for street crossings proper.

Every two of the vehicle-actuated controls are related, i. e., one of them is in a free street while the street in which the other control is positioned, is blocked, and vice versa. A circuit is provided per control, with means operated by its control for making and breaking the circuit, and each circuit includes an electrical condenser. A third electrical condenser operates the signalling device and is operated, in its turn, by means under the influence of the relative condition, for instance, the voltage difference of the condensers, in the two first-mentioned electrical units.

In the accompanying drawings, a system embodying my invention is illustrated diagrammatically by way of example.

In the drawings

Fig. 1a is a circuit diagram for a street crossing showing the controls and the traffic signal device, Fig. 1b is a side view of the switch in the street operable by the vehicles.

Figure 1:
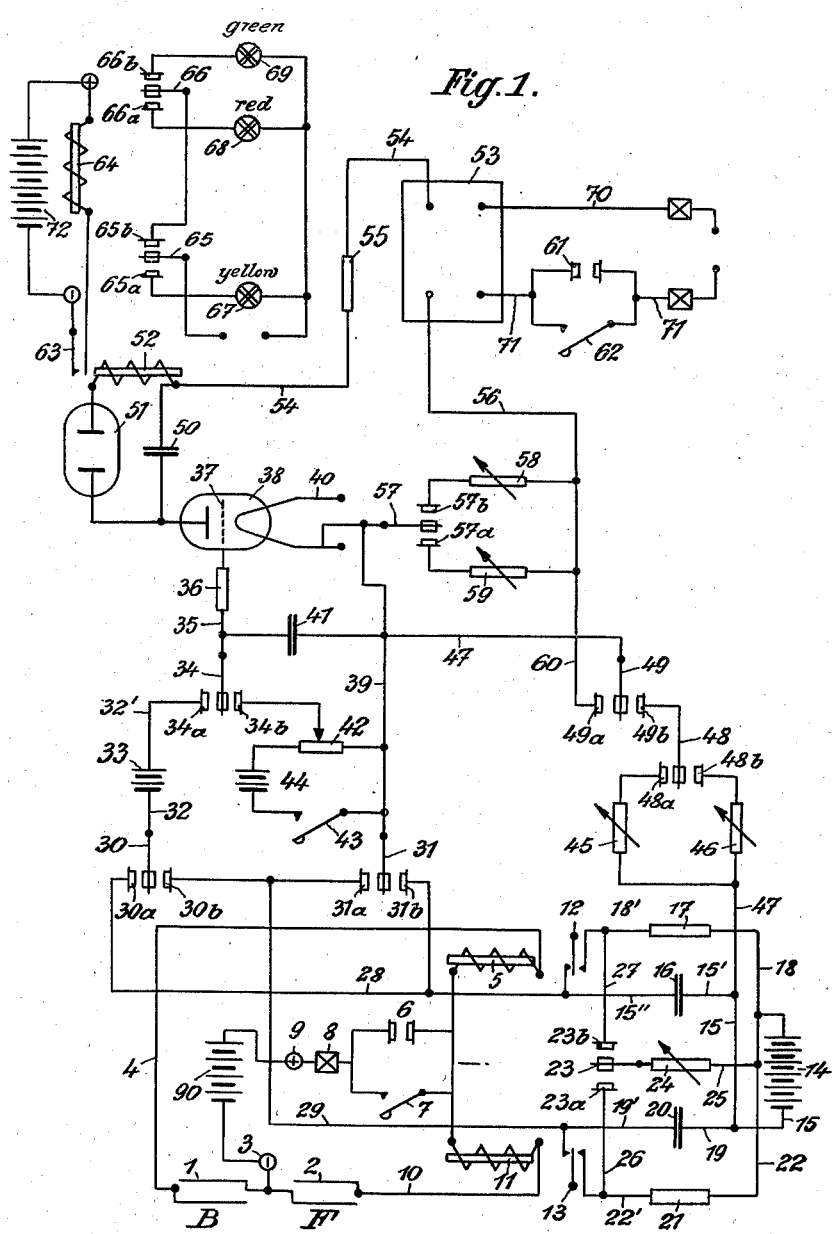
Fig. 1 is a diagram of the connections, switches, etc., of the system.

Fig. 1c is a top view showing the cam operated switches and the operator therefor, Fig. 1d is an end view of the operator and its circuit for the switches of Fig. 1c, Fig. 1e is an across the line diagram of Fig. 1, and Fig. 2 shows the periods during which the several switches of the system are open and closed while the system performs a cycle from "yellow" over "green" and "red" back to "yellow".

Referring now to the drawings, and first to Fig. 1, two correlated vehicle-actuated controls are shown at 1 and 2. The arrangement and the design of such controls are shown in Fig. 1b in which a switch arm 174 is pivoted at 175 and has a contact 172 cooperating with the contact 173. The arm 174 is spring pressed by spring 176 and wires 170 and 171 are the current connections. The controls are simply shown as switches. It has been assumed that the street in which the control 1 is positioned, is blocked at the time, as indicated by the letter "B," and that the street in which the control 2 is positioned, is free at the same time, as indicated by the letter "F". The switching means of the two controls are connected, at one terminal, to the negative terminal 3 of a battery 90. The other terminal of control 1 is connected to the positive terminal 9 by a circuit 4 which includes the coil of a relay 5, and a manually operated switch 7 in parallel with a switch 6 which is operated by a switch drum, as will be described below. The other terminal of control 2 is connected to the positive terminal 9 by a circuit 10 which includes the coil of another relay 11 and switches 6 and 7. Both circuits are connected to a safety fuse 8 which in turn is connected to the positive terminal 9 of battery 90.

The relays 5 and 11 operate contacts 12 and 13 which are of the continuity-preserving type, i. e., they make contact for a period which is independent of the period during which the relays attract their armatures. When attracted by its relay 5, the continuity-preserving contact 12 closes the following circuit: Battery 14, wire 15, wire 15', condenser 16, wire 15'', contact 12, wire 18', resistance 17, and wire 18. The circuit closed by the contact 13 is as follows: Battery 14, wire 15, wire 19, condenser 20, wire 19', contact 13, wire 22', resistance 21, and wire 22.

The wires 18' and 22' are connected, by wires 27 and 26, respectively, to the contacts 23b and 23a of a switch 23 which is also controlled by the switch drum referred to. A resistance 24 is connected to the switching member of switch 23 at one end, and to the wires 18 and 22 at its other end, by wire 25. By means of the switch 23, this resistance can be connected in parallel to the resistance 17 or to the resistance 21.

The condensers 16 and 20 are connected in series in the grid circuit as a valve 38 hereinafter described and are charged from battery 14 as often as the contacts 12 and 13 are closed by vehicle responsive impulses received from the controls 1, 2 in the blocked and free streets. The difference of the voltages in the two condensers 16 and 20 resulting from the charging thereof by these impulses is transferred to the thermionic valve 38 from contacts 12 and 13 by the following connections: Contact 12, wire 28, contacts 30a and 31b. The contacts 30a and 31b are parts of throw-over switches 30 and 31, respectively, whose other contacts 30b and 31a are connected to contact 13 by wire 29. Throw-over switch 30 is connected to a grid battery 33 by wire 32 and the battery 33 is, by wire 32', connected to a contact 34a of a throw-over switch 34 whose switching member is connected to the grid 37 of valve 38 through a wire 35 and a high-ohmic resistance 36. The other contact 34b of this throw-over switch is connected to a potentiometer 42 by a movable tap. Energy is supplied to the potentiometer 42 from a battery 44. The switching member of throw-over switch 31 is connected to the heating wire 40 of valve 38 by a wire 39. The potentiometer 42 is connected directly to the wire 39, and the battery 44 is connected to the wire 39 by a manually operated switch 43. Wires 35 and 39, and through them the grid 37 and the cathode of the valve 38, are connected to each other through a condenser 41, the third condenser hereinbefore mentioned for receiving the voltage difference of condensers 16, 20.

The series connection of the condensers 16 and 20 may be traced as follows through a complete circuit. The electric current from the condenser 16 passes through the wire 28 to the contact 30a, to the battery 33, contact 34a, wire 34, resistance 36, to the grid 37 of the valve 38. From this point the circuit is traced from the cathode of the valve 38 over the wire 40 to the switch 31 and then to the contact 31a, wire 29 to the condenser 20 and from there back to the condenser 16. In Fig. 1e the positions illustrated are those when a green light is showing. When a red light is showing the switches 30 and 31 are connected by means of the contacts 30b and 31b. The switch 34 remains in the position as illustrated. The circuit is thus traced as follows. From condenser 16 the current traverses the wire 28 to the contact 31b then over the wire 40 to the cathode and from there to the grid 37 and through resistance 36, wire 34, contact 34a, through the battery 33, switch 30 to the contact 30b and over the wire 29 to the condenser 20 and then back to the condenser 16.

A wire 47 leads from the wire 39 to the switching member of a switch 49; the contact 49b of switch 49 is connected to the arm of a switch 48, with contacts 48a and 48b. The contact 48a is connected to a resistance 45, the contact 48b is connected to a resistance 46, and both resistances are through the wires 47' and 15 connected to the battery 14. The wire 15 is connected to the condensers 16 and 20, and in conformity with the position of switches 31, 49, and 48, either the resistance 45 is connected in parallel to condenser 20, or the resistance 46 is connected in parallel to condenser 16.

The thermionic valve 38 acts as the variable resistance in a trigger circuit which includes a condenser 50, a relay 52 and a glow tube 51 in series with the relay 52 and in which the condenser is adapted to discharge through the tube when the voltage reaches a certain value. The circuit of glow tube 51 is supplied with current from a network through wires 70 and 71, and a device 53 for connecting the system to a network. A switch 61 which is operated by the above said switch drum, and a manually operated switch 62, are connected to the wire 71. A wire 54, with a high-ohmic resistance 55, and a wire 56, supply the circuit of glow tube 51. The wire 56 is connected to the contact 49a of switch 49 by a wire 60. A switch 57 has contacts 57a and 57b which are connected to wire 56 through resistances 58 and 59. Both resistances are variable. The circuit of the glow tube 51 is supplied either through resistance 58 or 59—in accordance with the position of the switching member 57 to the contacts 57a, 57b—or, if the switch 57 is open, and switch 49 closes contact 49a, through wires 60, 47, and 39.

When the relay 52 is excited, it closes a switch 63 which is connected to the negative terminal of a battery 72. The positive terminal of the battery 72 is connected to the coil of an electromagnet 64. The magnet 64 controls a suitable driving means, for instance, a pawl-and-ratchet mechanism which advances the switch drum. The mechanism and the switch drum are illustrated in Fig. 1b in which the mechanism is operated by a solenoid or magnet 64 in a circuit including the battery 72, switch arm 63 and coil 52 of a contact cooperating with the switch arm 63. The switching drum controls the sequence of the signals displayed by the yellow lamp 67, the red lamp 68, and the green lamp 69, through switches 65 and 66, with contacts 65a and 65b, and 66a and 66b, respectively, by which the lamps are connected to the terminals of an alternating-current system.

Switches 7, 43, and 62 which, as mentioned, are operated manually while all other switches and contacts, except relay contacts, are controlled by the switching drum through the pawl-and-ratchet mechanism and magnet 64, are permanently closed, as shown in the lowermost field of Fig. 2 where the heavy black line extends throughout the diagram. Consider now the "green" column. At the commencement of the green period, switch 23 closes contact 23a which is connected to resistance 21. Switch 30 closes contact 30a and connects wire 28 to battery 32. Switch 31 closes contact 31a and connects wires 29 and 39. Switch 34 closes contacts 34a and connects the grid 37 of valve 38 to the battery 33. Switch 57 closes contact 57a and cuts in the variable resistance 59. Switch 48 closes contact 48a and connects resistance 45 in parallel to condenser 20. Switch 49 closes contact 49b and connects wire 47 to wire 47' through resistance 45. Switches 65 and 66 close their contacts 65b and 66b, and make the circuit of the green lamp 69.

Switches 6 in the circuit of battery 90, and 61 in the supply wire 71, are closed. It has already been mentioned that the manually operated switches 7, 62 and 43 are also closed. The street in which the control 1 is positioned, is blocked (B), and the street in which control 2 is positioned is free (F). The green signal is displayed for this street.

As often as the control 1 in the blocked street (B) is operated by a vehicle, the continuity-preserving contact 12 is actuated by relay 5, the circuit of condenser 16 is closed, and the condenser charged. The closing period, however, is so short that the condenser 16 is not charged completely but only partly, and the successive increases in charge, decreases by a logarithmic law for every subsequent change owing to the increasing counter-voltage of the condenser. The vehicles arriving at the control in the blocked street at B, therefore produce an effect following a logarithmic law. The condenser 16 corresponds to the blocked street and, as shown by the diagram, the switch 23 closes contact 23b while the street is blocked by red light.

The condenser 20 corresponds to the free street. When control 2 (F) is operated by a vehicle moving in the free street, contact 13 is closed by the excited relay 11, and the switch 23, as described, makes contact at 23a. Resistance 24 is connected in parallel to resistance 21 and reduces the effect of resistance 21. By making the resistance 24 variable, variations of the distance of the control 2 in the free street from the crossing may be taken into consideration when the controls are arranged. This consideration of variations, however, is only required for the free street.

The condenser 20 is also charged by a logarithmic law, but its rate of charging is more rapid for a given number of impulses, on account of the parallel connection of resistance 24. The difference of the voltages between the condensers 16, 20 is a function of the ratio of operations of contacts 12 and 13, and consequently to the relative traffic density in the blocked and in the free street. This voltage difference, when the positions of the switches are as described, is connected between the grid 37, and the heating wire 40, of valve 38. At the same time, the resistance 45 is connected in parallel to the condenser 20 of the free street F. The resistance 45 permits a continuous discharge of the condenser 20. By this continuous discharge of the condenser 20 for the free street, the fact is considered that the vehicles which move past the control 2 in the free street, pass the crossing after a few seconds, and therefore the influence of these vehicles must disappear after the free period has elapsed. The resistance 45 is so designed that the maximum partial, i. e., initial, charge of the condenser 20, is discharged during a time which corresponds to the average time a vehicle requires for passing the crossing.

The resistance of valve 38 and the charging time of condenser 50 is determined by the voltage difference of condensers 16 and 20 which may be high or low, positive or negative. The voltage difference between the condensers 16 and 20 is zero when the traffic density in the crossing streets is the same. In this situation an influencing of the free and blocked periods will not take place. The direction of the voltage difference is dependent upon the voltages of the two condensers which operate on the grid 37, that is if the voltage of the condenser 16 is greater or smaller than the voltage of the condenser 20. In one case it is termed as positive and in the other it is negative. The charging time of condenser 50 may vary between the upper and lower limit for the period during which the green or red signal is displayed. The charging time is further varied by the resistances 58 and 59. The object of the resistances 58 and 59 is to consider the different traffic densities in the crossing streets. The resistances 58 and 59 consequently are only required if the traffic density in one of the crossing streets is permanently greater than in the other street.

When the condenser 50 has charged to the amount required, the glow tube or lamp 51 is ignited, the relay 52 is excited, the switch 63 is closed and the magnet 64, by means of the pawl-and-ratchet mechanism and the switching drum, throws over the switches 65 and 66 for yellow light, and the yellow lamp 67 shines.

The parallel connection of the switches 6 and 61 which are controlled by the switch drum, and the manually operated switches 7 and 62 is provided with the object of operating the system until the yellow light appears, after the switches 7 and 62 have been opened to put the signalling device out of action. When the signalling device is cut in again, it will at first display yellow light. With the object aforesaid, the switches 6 and 61 are so designed that they automatically assume their active position for "green" and "red" but are cut out for "yellow" by the switch drum, as will appear from Fig. 2.

In order to obtain a constant period for the displaying of the yellow lamp 67, the switch 49 is closed at 49a during the "yellow" periodls, Fig. 2, and the resistances 58, 59 are short-circuited thereby, so that the condenser 50 is charged in a correspondingly shorter time. At the same time, the grid 37 of the valve 38 is connected to a negative voltage from the potentiometer 42 by the switch 34 closing the contact 34b. When the switch 34 is at 34b, the difference of the condenser voltages at 16 and 20 does not influence the grid of valve 38, and, at the same time, further discharge of condenser 20 is prevented by the opening of 49a, 48b, 31a. The condenser 20 keeps the charge it has at the moment the light changes to "yellow", and the charges produced by the vehicles arriving in the street about to be blocked, are added to the residual charge the condenser 20 keeps.

From this moment, the residual charge, plus the charges produced by the arriving vehicles, are preserved in the condenser 20. When the signal changes to "green" the total charge of the condenser 16 for the blocked street is discharged through a resistance, and preferably through the same resistance 45.

Instead of providing the glow lamp 51 in the tilting oscillating circuit as described, for charging the condenser 50 under the control of the thermionic valve or amplifier tube 38, I may provide another amplifier tube to whose grid the voltage of condenser 50 is connected, and whose anode current is controlled by this voltage. The relay 52 is in the anode circuit of this other amplifier tube.

The operation of the traffic in the blocked and free streets upon the hereinbefore described system, to produce cyclic changes of the stop caution and go signals with periods of stop and go automatically variable in response to traffic densities in the two streets, is substantially the same as in the system described in my co-pending application Serial No. 667,868 filed April 25, 1933. That is the vehicles in the control area of the blocked street are counted and produce a corresponding number of current impulses at 1. The vehicles in the control area of the free street are likewise counted and produce a corresponding number of current impulses at 2. These two sets of impulses charge the condensers 16 and 20 according to a logarithmic law and at different rates as described, the resultant charges, coresponding to the ratio of the numbers of vehicles counted in the control areas of the two streets, being imposed on the amplifier 38 and condenser 41. The output voltage of this amplifier actuates the trigger circuit at intervals determined by the time required for this voltage to build up sufficiently to break down the gap of the glow tube 51. The length of these intervals is thus also a function of the ratio of traffic densities in the two streets. At each operation of the trigger circuit the relay 52 energizes the drive magnet 64 to advance the signalling device to display the next signal. Thus every vehicle arriving in the control area of the blocked street abbreviates the period of the stop signal and every vehicle passing through the control area of the free street lengthens the period of the go signal or in other words every vehicle in both streets exerts an influence on the signalling device favorable to the control of the actual condition of traffic flow in both streets.

By the term "traffic density" appearing in the specification is meant the number of vehicles which pass a certain point such as the street crossing during a definite unit of time, or in other words the number of vehicles passing over and operating the control switch B during a definite unit of time.

When the switch 49 contacts the contact 49a the current will flow from the one clamp of the network device 53 over the wires 56 and 60 to the contact 49a, then through the switch 49, over the wire 47 and then over the wire 39 to the cathode 40 and through the valve to the condenser 50, resistance 55 and wire 54 to the other clamp of the network device 53.

The controls 1 and 2 as well as the condensers 16 and 20 refer as well to both streets. The reversal of the current in the condensers 16 and 20 takes place by means of the switches 30 and 31.

The reversal of the lamps 67 to 69 takes place by means of the switch cylinder shown in Figs. 1c and 1d with the aid of the switch 65, 66. The drive for the switch cylinder takes place with the aid of the magnet 64, the circuit of which is controlled by the contact 63.

The relay 52 of the switch 63 is provided in the circuit of the condenser 50 and the tube 51. As soon as the condenser 50 has received a charge sufficient to start the glowing of the lamp 51, the current will flow through the coil of the relay 52. Thus the switch 63 will be closed. The coil 64 will be thus energized and the switch cylinder will be actuated so that the lamps will change as to their indication.

The condenser 50 is continuously charged by the device 53 by means of the resistance 55 and the valve 38. For the continuity of the charge two influences are essential, one that the resistance 58 or the resistance 59 or neither of these are in the circuit and second which tension or voltage is present between the grid 37 and the wire 40.

This tension is zero when the condensers 16 and 20 have the same potential. In this case the same change is only dependent on whether the resistance 58 or 59 or neither one of these resistances are switched into the circuit. The latter takes place when the switch 49 is in contact with the contact 49a. In this position the quickest charging of the condenser 50 will take place for a short period of the showing of the yellow signal.

If the resistance 58 or 59 is switched in a very definite time element takes place in order to charge the condenser 50 by means of the valve 38, provided that there is no difference in potential between the condensers 16 and 20. A difference in potential between the two condensers influences the charging time which takes into consideration as well a longer or a shorter period. This is entirely dependent upon whether the tension in the condenser 20 or in condenser 16 is greater than the two condensers which are connected with the valve by the switches 30 and 31. The condenser 20 as shown in Fig. 1e is connected to the cathode 40. The condenser 16 is connected to the grid 37. The condenser 20 is so arranged that as shown by the position of the switch it is for a free street and the condenser 16 is for a stop street. If now the tension in the condenser 16 is changed-over to condenser 20 then there is a shorter charging time of the condenser 50 and thus there is a change from red to green and from green to red which occurs during a quicker period of time.

If, however, the change-over takes place the condenser 16 will be connected to the cathode 40. If now there is an over-balance of the tension there is a greater time necessary for charging the condenser 50 and thus a longer time is necessary to carry out the change-over.

The switch 2 belongs to that particular street which as shown for the specific connections is for a free street. Thus it is necessary for the condenser 20 to have a parallel resistance connected thereto in order that the individual changes can after a certain time, flow through a resistance. This is necessary since otherwise the vehicles in the free street must have an opportunity to clear the intersection. As shown in Fig. 1e the condenser 20 is connected in parallel to the resistance 45.

The condenser 16 does not have a resistance connected to it in parallel since for a stop street there are no vehicles which would remain in the intersection. If, however, there is a change from green to red then the condenser 16 must be connected in parallel to a resistance and in contradistinction thereto the condenser 20 would not be connected to a resistance.

The change-over from green to red does not follow immediately but there is a yellow period between the green and red. Referring to Fig. 1e and Fig. 2 it will be noted that the green light is energized and then follows the closing of the switch 63 and the next operation of the switch drum by the coil 64 will result in a changing of the contacts in the switches 30, 34, 31, 49 and 57. At the same time a yellow light is energized by means of the switches 65—66. When the yellow light is showing the condenser 16 is connected to the cathode 40 but it has as yet no connection with the resistance 45 or 46 and thus there is as yet no discharge of the charge for the yellow light period. The condenser 20 has as yet no connection with the grid 37 but it also has no further connection with the resistance 45.

The charging of the condenser 50 is not influenced by a difference in the charge of the condensers 60 and 20 during the yellow light period. The time limit of the yellow light, that is the time for the charging of the condenser 50 is taken care of alone by the resistance of the valve and the resistance 55. The resistances 58 and 59 are not in the circuit with the valve.

If now after the yellow light period, a further operation of the switch drum takes place and therewith the showing of the red light, the switches 34 and 49 are actuated. The condenser 20 is connected with the grid 37 and at the same time the resistance 46 is connected in parallel with the condenser 16. This position remains until the next change to a yellow light period.

During the green light period there follows the charging of the condenser 50 by means of the resistance 59 whereas for a red light period this takes place in view of the resistance 58, whereas as already explained during the yellow light period the changing takes place directly through the circuit 60.

I claim:

1. An automatic traffic control system for interfering traffic lanes comprising a signalling device with go and stop signals for the control of traffic on said lanes, means operating said device to effect alternate changes of signals to said lanes periodically, means controlling the period between successive operations of the device operating means to cause said signalling devices to display signals for variable periods, a vehicle-actuated control for the lane having the go signal, a vehicle actuated control for the lane having the stop signal, each control having means for producing electrical impulses in response to actuation by vehicles on the respective lanes, a pair of condensers one of which is assigned to the control for the lane having the go signal and the other to the control for the lane having the stop signal, means responsive to the impulses produced by the go lane control for charging its corresponding condenser with successive increments of charge corresponding in number to the impulses produced in its control, a similar means for the condenser corresponding to the stop signal lane, and means for operating the period controlling means to apportion the period between said change of signals in dependence on the immediate resultant of the two sets of charges in said condensers during the particular period.

2. An automatic traffic control system for interfering traffic lanes comprising a signalling device with go and stop signals for the control of traffic on said lanes, means operating said device to effect alternate changes of signals to said lanes periodically, means controlling the period between successive operations of the device operating means to cause said signalling devices to display signals for variable periods, a vehicle-actuated control for the lane having the go signal, a vehicle actuated control for the lane having the stop signal, each control having means for producing electrical impulses in response to actuation by vehicles in the respective lanes, a pair of condensers one of which is assigned to the control for the lane having the go signal and the other to the control for the lane having the stop signal, means responsive to the impulses produced by the go lane control for charging its corresponding condensers with successive increments of charge decreasing by a logarithmic law and corresponding in number to the impulses produced in its control, a similar means for the condenser corresponding to the stop signal lane, and means for operating the period controlling means to apportion the periods between said changes of signals in dependence on the immediate resultant of the two sets of charges in said condensers during the particular period.

3. An automatic traffic control system for interfering traffic lanes comprising a signalling device with go and stop signals for the control of traffic on said lanes, means operating said device to effect alternate changes of signals to said lanes periodically, means controlling the period between successive operations of the device operating means to cause said signalling devices to display signals for variable periods, a vehicle-actuated control for the lane having the go signal, a vehicle actuated control for the lane having the stop signal, each control having means for producing electrical impulses in response to actuation by vehicles on the respective lanes, a pair of condensers one of which is assigned to the control for the lane having the go signal and the other to the control for the lane having the stop signal, means responsive to the impulses produced by the go lane control for charging the condenser with successive increments of partial charge decreasing by a logarithmic law and corresponding in number to the impulses produced in its control, a similar means for the condenser corresponding to the stop signal lane, resistances connected one with each condenser and through which it is successively charged, a manually variable resistance in parallel with the charging resistance of the condenser assigned to the go lane, and means for operating the period controlling means to apportion the periods between said change of signals in dependence on the immediate resultant of the two sets of charges in said condensers during the particular period.

4. An automatic traffic control system according to claim 1, in which a leak resistance is provided connected across the condenser of the go lane control and adapted to gradually discharge the said condenser during the go signal period.

5. An automatic traffic control system according to claim 1, in which a leak resistance is provided connected across the condenser of the free street control and adapted to gradually discharge the said condenser during the go signal period, and in which means are provided for cutting out said leak resistance when the signal changes to stop.

6. An automatic traffic control system for interfering traffic lanes comprising a signalling device with go and stop signals for the control of traffic on said lanes, means operating said device to effect alternate changes of signals to said lanes periodically, means controlling the device operating means to cause said signalling devices to display signals for variable periods, a vehicle-actuated control for the lane having the go signal, a vehicle actuated control for the lane having the stop signal, each control having means for producing electrical impulses in response to actuation by vehicles on the respective lanes, a pair of condensers one of which is assigned to the control for the lane having the go signal and the other to the control for the lane having the stop signal, means responsive to the impulses produced by the go lane control for charging its corresponding condenser with successive increments of charge corresponding in number to the impulses produced in its control, a similar means for the condenser corresponding to the stop signal lane, and means for operating the second-mentioned means in dependence on the immediate resultant of the two sets of charges in said condensers during the particular period.

FRITZ v. OPEL.